UNITED STATES PATENT OFFICE.

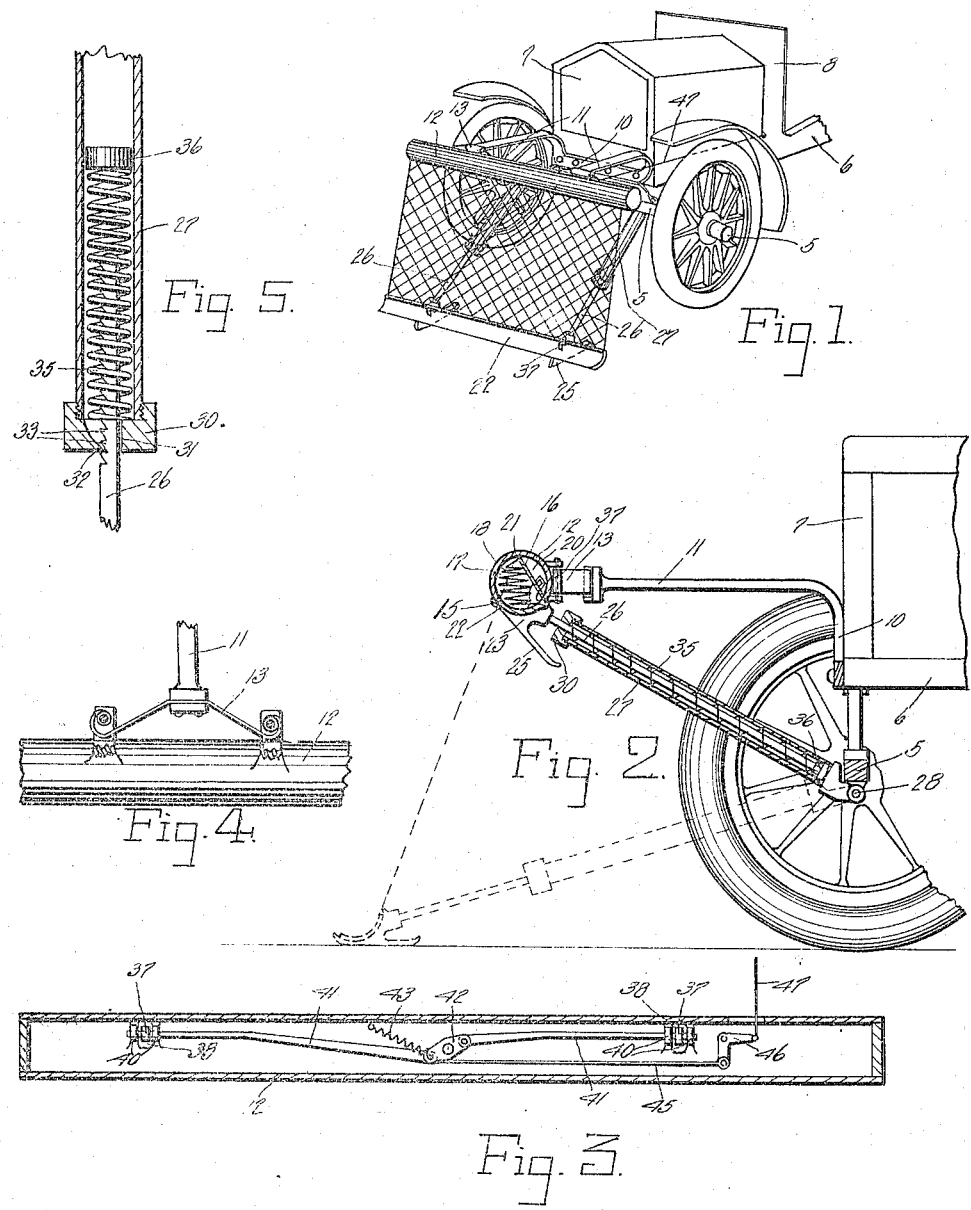

LUE V. GREGSON AND ARTHUR P. GOUGH, OF SEATTLE, WASHINGTON.

FENDER FOR WHEELED VEHICLES.

1,143,823.  Specification of Letters Patent.  Patented June 22, 1915.

Application filed May 7, 1914. Serial No. 836,843.

*To all whom it may concern:*

Be it known that we, LUE V. GREGSON, a subject of the King of England, and ARTHUR P. GOUGH, a citizen of the United States, both residing at Seattle, in the county of King and State of Washington, have invented certain new and useful Improvements in Fenders for Wheeled Vehicles, of which the following is a specification.

This invention relates to improvements in fenders for automobiles and other wheel-vehicles.

Among the objects of the invention is the provision of an improved fender for the protection of pedestrians, of simple, strong and inconspicuous construction, which may be folded in small compass and releasably secured in folded condition and extended in tripped position by simple tripping devices under the control of the driver.

A further object of the invention is the provision of improved means for quickly and positively dislodging and actuating the extension apparatus of the fender.

A still further object of the invention is the provision of means to utilize the fender casing as a resilient buffer to protect the vehicle and passengers from serious damage from head-on collisions.

Other objects of the invention will be apparent in the specification hereinafter detailed.

The invention consists in the novel construction of a fender of the class described, the combination and adaptation therewith of parts and devices for accomplishing the various stated and other objects, and as will be fully described in the following specification, illustrated in the accompanying drawings, and finally set forth in the appended claims.

In said drawings, Figure 1 is a perspective view of the front portion of an automobile to which an embodiment of my invention is shown applied, and in extended position. Fig. 2 is a side elevation of my invention partly in section, shown in full lines in folded condition and in dotted lines in the position illustrated in Fig. 1, and applied to an automobile with the proximate front wheel removed. Fig. 3 is a longitudinal sectional view through the casing buffer, illustrating the latching devices. Fig. 4 is a fragmentary exterior plan view of said casing, illustrating a manner of resilient suspension. Fig. 5 is a fragmentary detail longitudinal sectional view of the cylinder-members, with the fender-rod shown in its extended position.

Referring to said views and particularly to Figs. 1 and 2, the reference numeral 5 designates the front axle of an automobile, 6 the framework resiliently supported thereon, 7 the radiator for the cooling medium of the engine and 8 the dash-board, all as ordinarily arranged. Rigidly mounted upon said framework or radiator is a bracket 10, from which extend longitudinally directed integral arm-supports 11, to whose forward extremities a transversely arranged casing 12 is resiliently supported, as by leaf-springs 13, or in any other suitable manner. Said casing is substantially tubular in cross-section, save for a full length opening 15 in its exterior wall, and is divided interiorly by a partition wall 16 into two unequally proportioned compartments. The larger said compartment 17 is adapted for the reception of the folded fender-web 18 and is provided with said opening 15. The lesser compartment 20 contains the releasable latching devices for said web, to be hereinafter described. Said web is connected at one edge to the upper inner surface of the web-compartment 17, as at 21, and at its opposite edge is connected to a plate 22 arcuate in cross-section adapted to closely engage the exterior wall of said casing and cover the opening 15, being releasably secured in position at such closure by devices hereinafter described. Said plate 22 is rigidly connected to a pair of shoes 23, spaced apart, and each formed with a runner 25 adapted to engage with and slide over the road-bed surface when the fender is in its tripped position, as will be presently described. Each said shoe is further formed with a rigid socket connection with a plunger-rod 26 whose opposite end is slidably received within a cylinder 27. Said cylinder is pivotally connected at one end, as at 28, to the front axle 5, and at its opposite end is provided with a cap 30. Said cap is formed with an axially arranged passage 31, wherethrough said rod 26 enters the bore of said cylinder. The end wall of said cap is thinned, as at 32, in the upper surface of said passage, to afford an edge to engage one of the ratchet teeth 33 formed upon the upper portion of the plunger rod 26, as will be presently explained. Within said cylinder the plunger-rod 26 is adapted to extend axially, while between the rod and the cylinder-walls an extension coil spring 35 is positioned having one of its ends connected to the cylinder at its forward extremity, and its opposite end connected to a disk 36 adapted to be reciprocated within the cylinder-bore.

Reverting to the plate 22, it is formed with a pair of spaced apertured lugs 37 on its inner concave face in proximity of the respective ends thereof. When employed in the folded condition of the fender and as the closure of said web-compartment 17, said lugs protrude through holes 38 in said partition 16 and register respectively with apertured ears 40 upon the opposite sides of said holes. Latch-bolts 41 are arranged oppositely to enter the apertures of the respective said ears and lug to secure the same in locked position. The opposite ends of said latch-bolts are connected to the opposite ends, respectively, of a centrally-pivoted rock-lever 42 whereby both said bolts operate in unison. A spring 43 tends to urge said latch-bolts in engaged positions. A link 45 connects one end of said rock-lever with an arm of a bell-crank 46 whose other arm is operatively connected with a rod 47 which is adapted to be drawn rearwardly by the driver pushing downwardly upon a foot-pedal or other analogous devices, not shown.

The apparatus is mounted upon the automobile or other vehicle substantially as described, and is normally retained in folded condition but prepared for emergencies, as indicated in full lines in Fig. 2, wherein it will be seen that the web 18 is folded within relatively small compass and arranged within the compartment 17 so as to be quickly withdrawn therefrom. The plate 22 is positioned over said opening 15 and the lugs 37 engaged, as described, to retain the plate as a closure, the latch-bolts being retracted while the lug is positioned to be engaged thereby. As said plate is mounted with said casing, the rod 26 is thrust inwardly of the cylinder bore and engages the disk 36 and pushes the latter rearwardly of the cylinder in opposition to the power of said spring 35. Said spring is thus expanded and held in tension ready to act rapidly and effectively when required. The apparatus is retained about as described during the normal operations or travel of the vehicle. The casing is all that is plainly visible and all the parts exposed are strong, durable and of good appearance. When the fender is to be employed in an emergency or other application, the driver depresses the foot-pedal or other agency within the car to draw the rod 47 rearwardly and actuate the bell-crank 46 which, through the link 45, rocks the lever 42, withdrawing the bolts 41 from their engagement with the lugs 37. Immediately the latch-bolts 41 release the said lugs, the combined force of gravity and the positive thrust of the expanded spring 35 cause the plunger-rod 26 to push outwardly and through its axis, and being out of line with the center of the casing 12, result in the connected plate 22, plunger-rod 26, and cylinder 27 swinging about its pivotal connection 28 and forcibly descending to the road-bed, then assuming the position shown in Fig. 1, and in dotted lines in Fig. 2. In its descent, the plunger-rod is forcibly extended by the action of the spring 35. There being no mechanical connection between the plunger-rod and the actuating disk 36, the relatively strong, rapid momentum of the rod due to the power of the spring causes said rod to continue its movement beyond the travel of the disk, as shown in Fig. 5, and project itself outwardly for a considerable distance, whereupon the ratchet-teeth 33 engage the thin edge 32 of the cap 30, whereby the rod is held against reverse movement. The plate 22, in its descent, drags with it the connected web 18, which is stretched into the form of a net when the plate is in its lowermost position. The runners 25 support the lower edge of the fender and prevent any destructive effect thereon from any forward movement of the vehicle until the brakes thereof have brought the vehicle to a full stop. When it is desired to replace the fender in its folded condition, the plate 22 is raised and the plunger-rods 26 pushed within the cylinder 27, again expanding the springs 35, while the web is folded and positioned within the compartment 17 in condition to be quickly withdrawn therefrom without interference. The plate 22 is then positioned over the opening 15 and the lug 37 alined with the ears 38 by withdrawing the bolts 41 by manipulation of the rod 47, and by the release of the latter, the bolts engage said lug through the action of the spring 43.

The employment of the casing 12 as a buffer is readily understood from the foregoing description and an inspection of the drawings. The springs 13 resiliently supporting the casing act to absorb shocks encountered through head-on collision and to partially prevent the jar of objects falling into the net from being communicated unduly to the vehicle.

The use and purpose of the device is sufficiently obvious to make further explanation unnecessary. The advantages of the device may also be readily seen, including its simplicity of construction, pleasing appearance, and the quick and certain performance of its duty.

Having described our invention, what we claim, is—

1. In a fender for wheeled vehicles, in combination with a casing adapted to receive a net in folded condition, a plate arranged in parallel with said casing, said net having opposite edges connected to said casing and plate, means for releasably securing said plate to said casing, a pair of cylinders having axially arranged bores therein and pivotally connected to the vehicle, rods reciprocatively received in said cylinders and connected at their forward ends with said plate, and means within said cylinders adapted to extend said rods when the plate is released.

2. In a fender for wheeled vehicles, in combination with a casing adapted to receive a net in folded condition, a plate arranged in parallel with said casing, said net having opposite edges connected to said casing and plate, means for releasably securing said plate to said casing, a pair of cylinders having axially arranged bores therein and pivotally connected to the vehicle, rods reciprocatively received in said cylinders, and connected at their forward ends with said plate, and means to secure said rods in extended position.

3. In a fender for wheeled vehicles, in combination with a casing adapted to receive a net in folded condition, a plate arranged in parallel with said casing, said net having opposite edges connected to said casing and plate, means for releasably securing said plate to said casing, a pair of cylinders having axially arranged bores therein and pivotally connected to the vehicle, rods reciprocatively received in said cylinders and connected at their forward ends with said plate, and a coil-spring secured at one end to the forward portion of the cylinder-bore and at its other end adapted to be extended in tension upon the end of said rods.

4. In a fender for wheeled vehicles, in combination with a casing adapted to receive a net in folded condition, a plate arranged in parallel with said casing, said net having opposite edges connected to said casing and plate, means for releasably securing said plate to said casing, a pair of cylinders having axially arranged bores therein and pivotally connected to the vehicle, rods reciprocatively received in said cylinders and connected at their forward ends with said plate, a coil-spring secured at one end to the forward portion of the cylinder-bore and at its other end adapted to be extended in tension upon the end of said rods, and means to secure said rods in extended positions.

5. In a fender for wheeled vehicles, in combination with a casing adapted to receive a net in folded condition, a plate arranged in parallel with said casing, said net having opposite edges connected to said casing and plate, means for releasably securing said plate to said casing, a pair of cylinders having axially arranged bores therein and pivotally connected to the vehicle, rods reciprocatively received in said cylinders and connected at their forward ends with said plate, and a coil-spring secured at one end to the forward portion of the cylinder-bore and at its other end provided with a disk adapted to bear against the end of said rods.

Signed at Seattle Wash., this 1st day of May, 1914.

LUE V. GREGSON.
ARTHUR P. GOUGH.

Witnesses:
E. PETERSON,
HORACE BARNES.